(12) United States Patent
Mosconi et al.

(10) Patent No.: US 10,070,750 B2
(45) Date of Patent: Sep. 11, 2018

(54) DEVICE FOR HEATING AN AMOUNT OF LIQUID, PARTICULARLY MILK, IN A CONTAINER

(71) Applicant: Gruppo Cimbali S.p.A., Binasco (IT)

(72) Inventors: Claudio Mosconi, Binasco (IT); Guido Quaratesi, Binasco (IT)

(73) Assignee: GRUPPO CIMBALI S.P.A. (IT)

( * ) Notice: Subject to any disclaimer, the term of this patent is extended or adjusted under 35 U.S.C. 154(b) by 492 days.

(21) Appl. No.: 14/616,282

(22) Filed: Feb. 6, 2015

(65) Prior Publication Data
US 2015/0223634 A1 Aug. 13, 2015

(30) Foreign Application Priority Data

Feb. 7, 2014 (IT) .............................. MI2014A0181

(51) Int. Cl.
*A47J 31/44* (2006.01)
*F16L 21/02* (2006.01)

(52) U.S. Cl.
CPC ........... *A47J 31/4489* (2013.01); *F16L 21/02* (2013.01)

(58) Field of Classification Search
CPC .............................. A47J 31/4489; F16L 21/02
USPC ......... 99/279, 280, 281, 284, 287, 290, 292, 99/293, 297, 300, 323, 453
See application file for complete search history.

(56) References Cited

U.S. PATENT DOCUMENTS

| 4,527,467 A | * | 7/1985 | Siemensma | A47J 31/0605 210/474 |
| 2005/0005780 A1 | * | 1/2005 | Beretta | A47J 31/4489 99/453 |
| 2007/0131797 A1 | * | 6/2007 | Balkau | A47J 31/4489 239/428.5 |
| 2008/0148959 A1 | * | 6/2008 | Bockbrader | A47J 31/402 99/323.3 |
| 2010/0154648 A1 | * | 6/2010 | Angeletti | A47J 31/4489 99/293 |

FOREIGN PATENT DOCUMENTS

| EP | 1 527 721 A1 | 5/2005 |
| EP | 1 776 905 A1 | 4/2007 |
| WO | 03092458 A1 | 11/2003 |

* cited by examiner

*Primary Examiner* — Phuong Nguyen
(74) *Attorney, Agent, or Firm* — Alan G. Towner, Esq.; Leech Tishman Fuscaldo & Lampl

(57) ABSTRACT

A device for heating an amount of liquid in a container using steam, comprising a steam conduit coaxially arranged in a tubular element which axially extends substantially from the inlet end to the outlet end of the steam conduit from which it is radially spaced thereby forming a first axially-extending annular air gap. Said tubular element is coaxially arranged in a sleeve thereby forming a second axially-extending air gap, said first air gap and said second air gap being closed at both respective axial ends on said tubular element. The steam conduit is made of a polymeric material having a low heat transfer coefficient, the tubular element is made of a metal material and said sleeve is also made of a polymeric material having a low heat transfer coefficient.

10 Claims, 2 Drawing Sheets

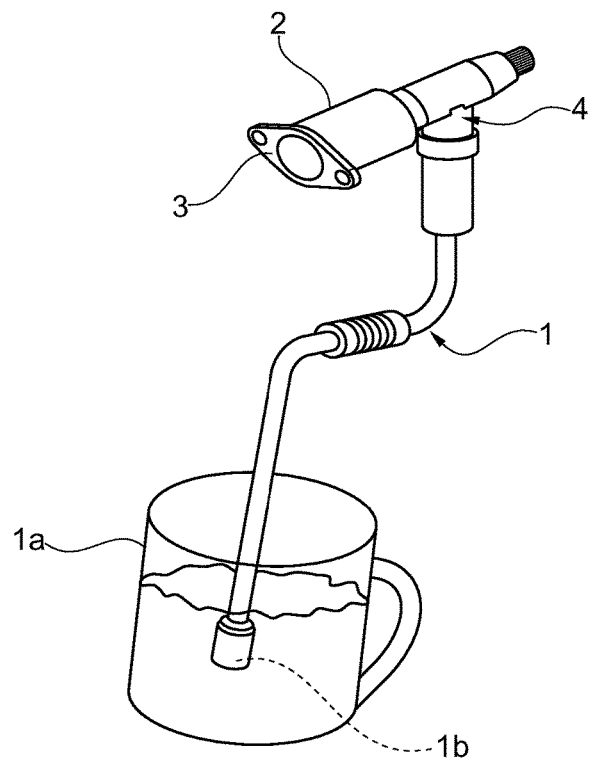
Fig. 1
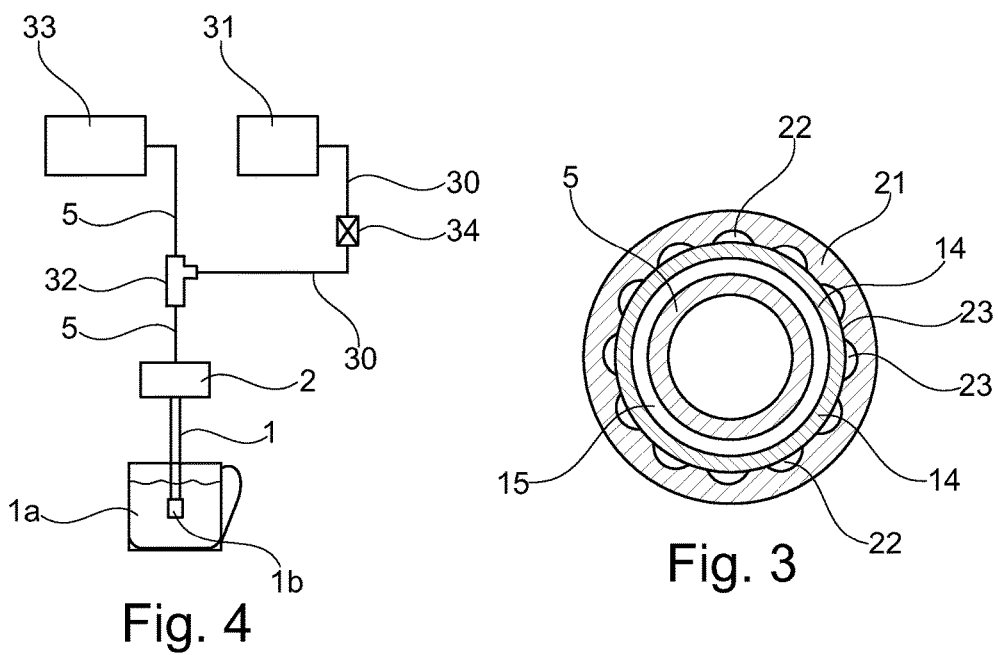
Fig. 4
Fig. 3

DEVICE FOR HEATING AN AMOUNT OF LIQUID, PARTICULARLY MILK, IN A CONTAINER

CROSS-REFERENCE TO RELATED APPLICATION

This application claims the benefit of Italian Patent Application No. IT MI2014A000181 filed Feb. 7, 2014, which is incorporated herein by reference.

BACKGROUND OF THE INVENTION

The present invention relates to a device for heating an amount of liquid in a container using steam, comprising a steam source, a conduit for the passage of steam, said conduit having an inlet end through which the steam that comes from the source enters, and an outlet end through which the steam exits and flows into the amount of liquid to be heated, said second end being able either to be located outside the container or within the amount of liquid in the container.

The steam source from which the liquid heating steam is derived, preferably consists of the boiler in a coffee machine for both professional and home use.

The same device which by the present invention is referring to may be supplied with a mixture of steam and pressurized air, thereby causing both heating and frothing of the liquid, particularly when the latter is milk.

Namely, in the prior art, the steam conduit outlet end has a bulb-shaped terminal that can be removed from such end, with one or more nozzles through which steam exits.

These types of devices are generally known and widely used with coffee machines, which have the inlet end of the conduit connected thereto by a sealed joint, for steam to pass through the conduit to heat the liquid in the container.

The joint allows the user to place the conduit outlet end both outside and inside the container, and immerse it in the amount of liquid to be heated.

Examples of these devices, which are known in the field of coffee machines as steam wands, are disclosed in WO 03/092458 and EP 1776905.

Since the steam that flows through the conduit of the device is at a high temperature, sometimes even slightly above 100° C., because it preferably is overheated steam, the outer surface of the conduit, which is usually made of stainless steel, copper, brass or bronze also reaches a rather high temperature.

Therefore, such high temperature affects handleability of the conduit in placing the steam outlet end into the container and the liquid to be heated, as it involves serious burn hazards for the operator.

Furthermore, due to the high temperature reached by the conduit, when the liquid to be heated is milk, deposits build up on the submerged conduit portion, due to milk calcification, and these deposits are not easily removed during the ordinary device cleaning procedure.

In an attempt to at least partially obviate the above drawbacks, from US 2010/0154648-A1 it is known to make a steam conduit from a polymeric material having a low heat transfer coefficient, and coaxially place it in a tubular metal element, separate therefrom by an air gap, the tubular metal element being the structural member for connection of the steam device to the coffee machine and for handing the conduit as it is introduced into the container in which the amount of liquid, particularly milk, to be heated, is contained.

It is also known in the art, as disclosed by EP 1.527.721-A1, to provide a heating device in which the steam conduit is made of a metal material, particularly steel, such that it may ensure the structural functions required for connection to the coffee machine and handling by the operator, and is enclosed in a shell made of a polymeric material having a low heat transfer coefficient, such as polybutylene terephthalate (PBT), polyamide (PA), polyethylene terephthalate (PET), and tightly fitted against the metal conduit.

Nevertheless, both the above mentioned prior art technologies were found to be unable to completely solve the problem of maintaining the temperature of the outer surface of the device, i.e. the surface designed to be contacted by the operator, low enough to prevent the build-up of deposits in the conduit section immersed in the liquid, particularly when the latter is milk, without affecting heating effectiveness.

The problem is solved by a heating device comprising a steam source, a conduit for the passage of steam, said conduit having an inlet end through which the steam that comes from the source enters, and an outlet end, through which the steam exits and flows into the amount of liquid to be heated, said second end being either located outside the container or within the amount of liquid in the container, said steam conduit being coaxially arranged in a tubular element which axially extends substantially from the inlet end to the outlet end of the steam conduit from which it is radially spaced, thereby forming a first axially-extending annular gap, said first gap being closed at both respective axial ends on said tubular element, said tubular element being coaxially arranged in a sleeve, thereby forming a second axially-extending gap, said second gap being closed at both their respective axial ends on said tubular element.

BRIEF DESCRIPTION OF THE DRAWINGS

The invention will be now described in greater detail with reference to one embodiment thereof, given by way of illustration and without limitation, and shown in the annexed drawings, in which:

FIG. 1 shows a diagrammatic perspective view of a device for heating liquids, particularly milk, using the steam delivered by a coffee machine;

FIG. 3 shows a cross sectional view of the device, as taken along the line III-III of FIG. 2;

FIG. 4 shows a diagrammatic view of the heating device of the invention as it is arranged to deliver a mixture of steam and pressurized air for heating and frothing the liquid, especially when the latter is milk.

DESCRIPTION OF PREFERRED EMBODIMENT

Figure 2:
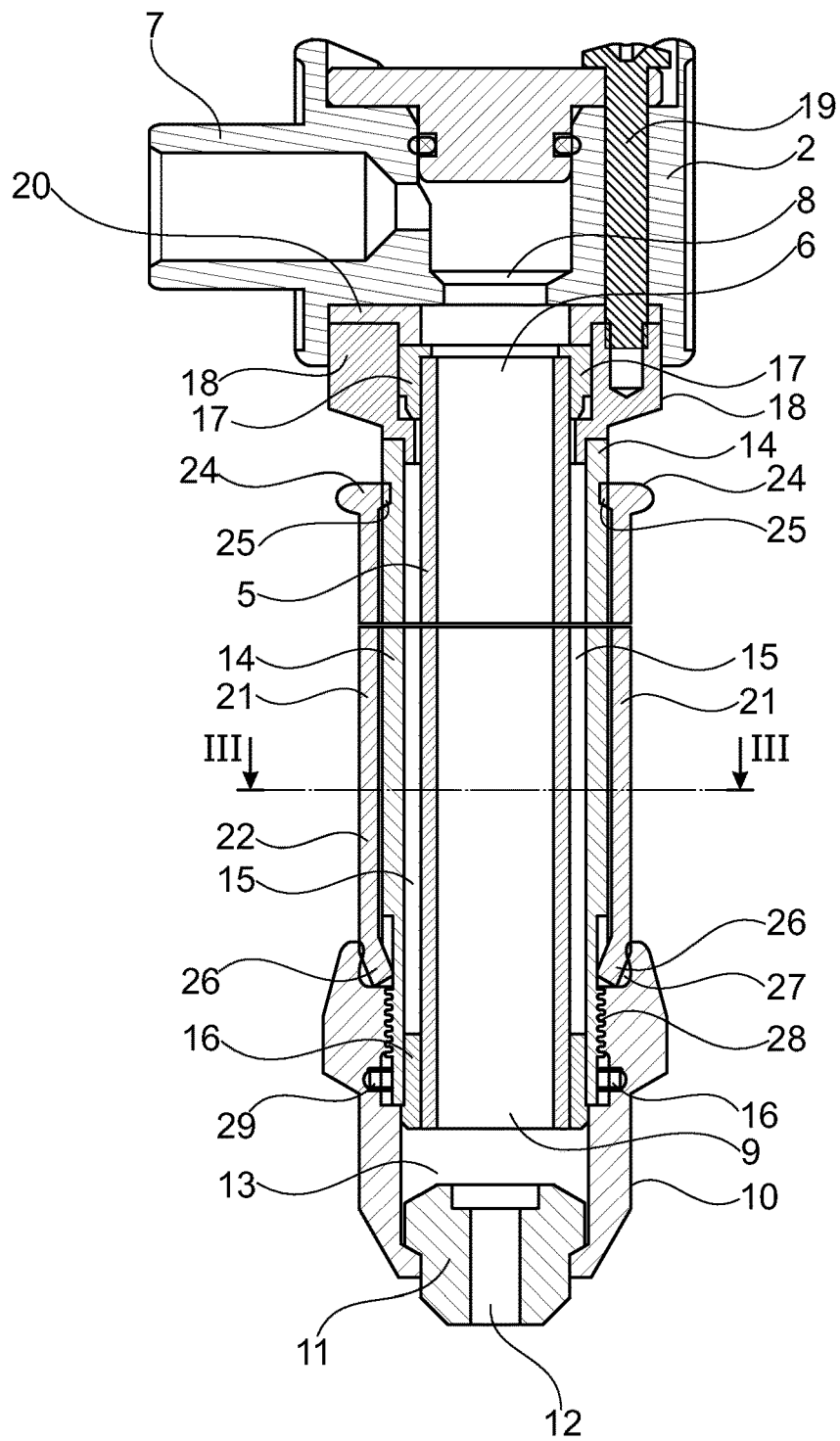
FIG. 2 shows a longitudinal sectional view of the structure of the heating device of the invention.

Referring to the above figures, and particularly to FIG. 1, the heating device, which is known in the field of coffee machines as steam wand, and is generally designated herein by numeral 1, comprises a body 2 with a flange 3, through which it is mechanically connected to a coffee machine for professional or home use, the latter being conventional and not shown herein.

The connecting body 2 has a joint, generally referenced 4, which receives the steam, preferably overheated steam, generated in the coffee machine boiler, the latter acting as a steam source.

The liquid to be heated, particularly milk, is contained in a container 1a, which is placed below the end 1b of the device 1.

Alternatively, the liquid to be heated may be water for preparing infusions, such as camomile or tea, without limitation to other liquids preferably adapted to make a hot beverage.

The joint 4 allows an operator to move the device 1 relative to the support 2 in multiple directions to facilitate insertion of the delivery end 1b into the container 1a.

Referring to FIG. 2, the device 1 comprises a conduit 5 for the passage of steam. The conduit 5 has an inlet end 6 through which the steam from the source, not shown, is admitted through the connections 7 and 8 in the joint 4.

Once the steam has flown through the entire conduit 5, it reaches the outlet end 9, through which the device comprises a terminal 10 with a nozzle 11 having at least one hole 12, for connection of a chamber 13 formed by the terminal in front of the outlet end 9 of the conduit 5 to the outside environment.

The steam conduit 5 is coaxially arranged in a tubular element 14 which axially extends substantially from the inlet end 6 to the outlet end 9 of the conduit 5 from which it is radially spaced, thereby forming a first axially-extending annular gap 15.

According to the invention, the steam conduit 5 is made of a polymeric material having a low heat transfer coefficient.

For example, suitable materials therefor may be polybutylene terephthalate (PBT), polyamide (PA), polyethylene terephthalate (PET), or a material known commercially as Teflon.

Still according to the invention, the tubular element 14 is preferably made of a metal material, such as stainless steel, copper, brass or bronze.

Alternatively, the tubular element 14 may be also made of a polymeric material having a low heat transfer coefficient.

The gap 15 is sealed at the outlet end 9 of the conduit by an annular seal 16 and at the inlet end 6 by an annular seal 17 placed between the conduit 5 and a ring 18 which is connected to the body 2 of the joint 4 by means of a screw 19.

A metal flange 20 connected to the conduit 5 is interposed between the body 2 and the ring 18.

According to the invention, the tubular metal element 14 in which the steam conduit 5 is contained is coaxially arranged in an external sleeve 21, thereby forming a second gap 22, also extending axially like the first gap 15.

Referring to FIG. 3, the second gap 22 is preferably composed of a plurality of channels formed in the inner surface of the sleeve 21 and arranged over the circumference of the sleeve 21, with ribs 23 therebetween that, in a particular construction arrangement, may tightly fit against the underlying surface of the tubular element 14.

The second gap composed of the plurality of channels 22 is also sealed on the tubular element 14 both at its end proximate to the inlet 6 of the conduit 5 and at its end proximate to the outlet 9.

For the end proximate to the inlet 6, the sleeve 21 has an annular flange 24 which radially extends toward the tubular element 14 with which it is sealingly engaged within a corresponding annular groove 25.

At the end 26 proximate to the outlet 9, the sleeve 21 is axially engaged within an annular housing 27 of the terminal 10.

The latter engages by threads 28 with the tubular metal element 14, with an annular seal 29 interposed therebetween.

The above disclosure clearly shows that, as the terminal 10 is connected to the tubular element 14, by being tightened on the threads 28, the end 26 of the sleeve 21 is pressed against the tubular element 14, thereby sealing the gap 22.

The sleeve 22 is also made of a polymeric material having a low heat transfer coefficient, essentially of the same type as mentioned above for the steam conduit.

Referring to FIG. 4, the heating device of the invention, according to a variant embodiment, is shown to comprise an additional conduit, diagrammatically referenced 30, which extends from a pressurized air source, diagrammatically referenced 31, which may consist of an air intake and of a motor pump, is connected at 32 with the conduit 5 that extends from the steam source, diagrammatically referenced 33.

A valve device 34 is provided on the pressurized air conduit, to open the conduit and form a mixture of steam and pressurized air in the conduit 5 to ensure, in addition to heating, frothing of the liquid in the container 1a, if such liquid is milk.

What is claimed is:

1. A device for heating an amount of liquid in a container using steam, comprising a steam source, a conduit for the passage of steam, said conduit having an inlet end through which the steam that comes from the source enters, and an outlet end, through which the steam exits and flows into the amount of liquid to be heated, said outlet end being either located outside the container or within the amount of liquid in the container, said steam conduit being coaxially arranged in a tubular element which axially extends substantially from the inlet end to the outlet end of the steam conduit from which it is radially spaced, thereby forming a first axially-extending annular gap, said first gap being closed at both respective axial ends on said tubular element, said tubular element being coaxially arranged in a sleeve, thereby forming a second axially-extending gap, said second axially extending gap comprising a plurality of channels formed in the inner cylindrical surface of said sleeve, the channels of said plurality of channels extending axially and being circumferentially arranged over said inner cylindrical surface with ribs therebetween whose radial ends are tightly fit against the underlying surface of said tubular element, said channels furthermore being closed at both their respective axial ends on said tubular element.

2. The device as claimed in claim 1, further comprising a pressurized air source, an additional conduit connecting said pressurized air source with said steam conduit, to supply pressurized air therein and form an air-steam mixture, valve means being provided to open and close said additional pressurized air conduit.

3. The device as claimed in claim 1, wherein said steam conduit is made of a polymeric material having a low heat transfer coefficient, said tubular element is made of a metal material and said sleeve is also made of a polymeric material having a low heat transfer coefficient.

4. The device as claimed in claim 1, wherein said tubular element which axially extends substantially from the inlet end of the steam conduit to the outlet end thereof, is equipped with a removable tubular terminal, which is connected to the end proximate to the outlet end of the steam conduit, and forms a chamber for steam in front of the outlet end of the steam conduit, said terminal having a nozzle with at least one steam outflow hole, which connects said chamber with the outside environment.

5. The device as claimed in claim 4, wherein said terminal has means for closing the end of said second annular air gap at the axial end thereof proximate to the end of said tubular element having said terminal connected thereto.

6. The device as claimed in claim 5, wherein said means for closing the end of said second annular gap against said tubular element comprise an annular housing on said terminal, which is axially open toward the opposite end of said sleeve, which is sealingly engaged within said annular housing.

7. The device as claimed in claim 4, wherein said removable tubular terminal is connected to said tubular element by a threaded coupling.

8. The device as claimed in claim 7, wherein said threaded coupling comprises at least one axial and radial sealing member.

9. The device as claimed in claim 1, wherein said sleeve comprises a flange that extends radially inwards from the sleeve and is located at the end proximate to the inlet of said steam conduit, said flange being circumferentially engaged with said tubular element and sealing said second gap.

10. The device as claimed in claim 1, wherein respective seals between said tubular element and said steam conduit at both their axial ends are provided, said seals sealing said first gap.

* * * * *